United States Patent
Zhang et al.

(10) Patent No.: US 9,006,659 B2
(45) Date of Patent: Apr. 14, 2015

(54) METHOD AND APPARATUS FOR DETECTING SPECTRAL CHARACTERISTICS OF MULTI-BAND MOVING OBJECTS

(71) Applicant: Huazhong University of Science and Technology, Wuhan (CN)

(72) Inventors: Tianxu Zhang, Wuhan (CN); Zheng Fang, Wuhan (CN); Xiangyan Liu, Wuhan (CN); Wei Zhang, Wuhan (CN); Ping Fu, Wuhan (CN); Xiaoyong Bian, Wuhan (CN); Hao Li, Wuhan (CN); Gaofei Li, Wuhan (CN); Weidong Yang, Wuhan (CN)

(73) Assignee: Huazhong University of Science and Technology, Wuhan (CN)

( * ) Notice: Subject to any disclaimer, the term of this patent is extended or adjusted under 35 U.S.C. 154(b) by 215 days.

(21) Appl. No.: 13/845,142

(22) Filed: Mar. 18, 2013

(65) Prior Publication Data

US 2013/0214164 A1    Aug. 22, 2013

Related U.S. Application Data

(63) Continuation-in-part of application No. PCT/CN2012/070094, filed on Jan. 6, 2012.

(51) Int. Cl.
  *G01J 5/00*   (2006.01)
  *G01J 3/36*   (2006.01)
  *G01S 3/786*  (2006.01)
  *G01J 3/28*   (2006.01)

(52) U.S. Cl.
  CPC ............... *G01J 5/0022* (2013.01); *G01J 3/36* (2013.01); *G01S 3/7864* (2013.01); *G01J 3/2823* (2013.01)

(58) Field of Classification Search
  CPC .......................... G01S 11/12; G01J 5/0022
  USPC .................................................. 250/339.14
  See application file for complete search history.

(56) References Cited

U.S. PATENT DOCUMENTS

2009/0147238 A1*  6/2009  Markov et al. ............. 356/3
2010/0278387 A1* 11/2010  Agurok et al. ............. 382/103

* cited by examiner

*Primary Examiner* — Constantine Hannaher
(74) *Attorney, Agent, or Firm* — Matthias Scholl P.C.; Matthias Scholl

(57) ABSTRACT

A method for detecting spectral characteristics of multi-band moving objects. The method includes: 1) dividing a full field of view into several subfields of view, and scanning and extracting suspected objects in each subfield one by one; 2) correlating interrelated suspected objects in adjacent subfields via coordinates to determine objects of interest that exist in the full field of view; 3) calculating the speeds of the objects of interest; 4) calculating average speed of all of the objects of interest and classifying the objects of interest according to their average speed; 5) compensating and rectifying the objective spectrum obtained from calculation; and 6) matching the compensated and rectified objective spectrum with a spectrum fingerprint database whereby realizing recognition of the multi-band moving objects.

6 Claims, 21 Drawing Sheets

METHOD AND APPARATUS FOR DETECTING SPECTRAL CHARACTERISTICS OF MULTI-BAND MOVING OBJECTS

CROSS-REFERENCE TO RELATED APPLICATIONS

This application is a continuation-in-part of International Patent Application No. PCT/CN2012/070094 with an international filing date of Jan. 6, 2012, designating the United States, now pending, and further claims priority benefits to Chinese Patent Application No. 201110430969.9 filed Dec. 20, 2011. The contents of all of the aforementioned applications, including any intervening amendments thereto, are incorporated herein by reference. Inquiries from the public to applicants or assignees concerning this document or the related applications should be directed to: Matthias Scholl P. C., Attn.: Dr. Matthias Scholl Esq., 14781 Memorial Drive, Suite 1319, Houston, Tex. 77079.

BACKGROUND OF THE INVENTION

1. Field of the Invention

The invention relates to a method and an apparatus for detecting spectral characteristics of multi-band moving objects that can be used for detecting and identifying objective spectral characteristics of time/space varying objects in fields of remote sensing, measurement and control, spectral analysis and so on.

2. Description of the Related Art

Any objects with temperature higher than absolute zero can generate infrared radiation, and the higher the temperature, the bigger the energy comes out of the radiation, and the spectral characteristics curve of object is unique. Types of objects to be identified and capability of identifying can be increased if infrared spectral information and infrared imagery are integrated. Therefore, research and development of apparatus relating to spectral imaging are of great importance all over the world At present, a frequently used image-spectrum apparatus integrates a multi-spectral scanner with a Fourier transformed infrared imaging spectrometer. The multi-spectral scanner is usually installed on aircraft, and the received instantaneous field of view move perpendicularly to the direction of flight by rotating scanning rotation mirror so as to realize scanning With forward movement of the aircraft, after the multi-spectral scanner finishes two-dimensional scanning, terrain scenes are scanned point by point and measured section by section to obtain multi-spectral remote sensing image information. The above method is rather suitable for non-real-time detection of static objects than for moving objects. The Fourier transformed infrared imaging spectrometer can provide abundant two-dimensional space information and third dimensional spectrum data, namely spectrum information can be extracted from every point in a two-dimensional space image. One sensor is shared by image and spectrum detection and the amount of information of signal processing is quite large, thereby it is impossible to achieve high spatial resolution and high time resolution at the same time, and the price is very high, which made it unacceptable for users.

In practical use, the spectra of static terrain scene and sky background need not to be obtained in real-time, instead, spectral characteristics need to be used in automatically detecting and identifying the moving objects or time-variant objects (regional area) in real-time such as plane in flight, ships on the sea, moving vehicle, fire hazard, explosion and so on.

There are several disadvantages with current spectrum imager in the automatic detection and spectrum recognition of moving objects and time-variant objects: firstly, they are not suitable for measuring spectrum of middle and regional area in view field; secondly, they fail to automatically track and measure the spectrum of multiple moving objects; thirdly, the existing apparatus are incapable of online processing and recognizing object spectrum; fourthly, performance speed is low and the price is high.

SUMMARY OF THE INVENTION

In view of the above-described problem, it is one object of the invention to provide a method for quickly detecting and identifying spectral characteristics of multi-band moving objects and an apparatus thereof. This invention not only has integrating characteristics of multi-spectral scanner and Fourier transformed infrared imaging spectrometer, but also can automatically detect, track, recognize, measure spectrum of multiple moving objects and time-variant objects in the scenes.

To achieve the above objective, in accordance with one embodiment of the invention, there is provided a method for detecting spectral characteristics of multi-band moving objects, the method comprising:

(1) dividing a full field of view into several subfields of view, and scanning and extracting suspected objects in each subfield one by one;

(2) correlating interrelated suspected objects in adjacent subfields via coordinates to determine objects of interest that exist in the full field of view, a current coordinate position of the objects of interest being denoted as $T'_n(xk_n, yk_n)$, n=1, 2, 3 ... N, N representing a number of the objects of interest;

(3) calculating the speeds of objects of interest $$\begin{cases} v_{nx} = \dfrac{(xk_n - x0_n)f}{k} \\ v_{ny} = \dfrac{(yk_n - y0_n)f}{k}, \end{cases}$$

representing a frame number of objects moving from starting point $(x0_n, y0_n)$ to coordinate $(xk_n, yk_n)$, and f representing a frame frequency of long-wave infrared images;

(4) calculating average speed of all objects of interest and classifying the objects of interest according to their average speed: if the objects of interest are static or moving slowly, a conventional mode is selected; if the objects of interest are moving fast, a fast response mode is selected; if the objects of interest are time-varying, a concentration mode is selected;

the conventional mode comprising: tracking and calculating spectrum of each object of interest from left to right, from top to bottom one by one;

the concentration mode comprising: continuously tracking and measuring spectrum of certain objects of interest;

the fast response mode comprising: tracking and calculating spectrum of each object of interest sequenced according to priority order one by one;

the priority order in descending order being:

i) objects in the vicinity of a boundary of a range of a center of an optical axis and moving out of the boundary;

ii) objects in the boundary of a range of a center of an optical axis and moving towards the boundary;
iii) objects moving to inner side of a range of a center of an optical axis; and
iv) objects keeping static in the view field;
when objects with the same priority being sequenced, a following rule being followed: fast moving objects being measured first and objects out of tracking range not measured;
(5) compensating and rectifying the objective spectrum obtained from calculation; and
(6) matching the compensated and rectified objective spectrum with a spectrum fingerprint database whereby realizing recognition.

An apparatus capable of implementing the method, comprises a two-dimensional stepping scanning and tracking rotating mirror, a spectroscope, a long-wave infrared lens unit, a long-wave infrared imaging unit, a near/short/medium wave infrared lens unit, a multi-band spectrum-measuring unit, and a calculating/controlling unit, the two-dimensional stepping scanning and tracking rotating mirror reflects the objective infrared light to the spectroscope;

the spectroscope transmits long wave of the infrared light to the long wave infrared lens unit;

the long wave infrared lens unit focalizes the long wave infrared light, and transmits the long wave infrared light to the long wave infrared imaging unit;

the spectroscope reflects the near/short/medium wave infrared light of the infrared light to the near/short/medium wave infrared lens unit;

the near/short/medium wave infrared lens unit focalizes near/short/medium wave infrared light, and transmits the near/short/medium wave infrared light to the multi-band spectrum-measuring unit;

imaging result of the long wave infrared imaging unit and the spectrum measurement data of the multi-band spectrum-measuring unit are transmitted to calculation/control unit;

the calculation/control unit controls two-dimensional stepping scanning and tracking rotation minor to scan full view field to extract suspected objects in each subfield of view;

correlating interrelated suspected objects in adjacent subfields via coordinates to identify the existing objects of interest in full view field, a current coordinate position of the objects of interest being denoted as $T_n'(xk_n, yk_n)$, n=1, 2, 3, . . . , N, N representing a number of the objects of interest;

calculating the speed of objects of interest $$\begin{cases} v_{nx} = \dfrac{(xk_n - x0_n)f}{k} \\ v_{ny} = \dfrac{(yk_n - y0_n)f}{k}, \end{cases}$$

and k representing a frame number of objects moving from starting point $(x0_n, y0_n)$ to coordinate $(xk_n, yk_n)$, and f representing a frame frequency of long wave infrared images;

calculating average speed of all objects of interest and classifying the objects of interest according to their average speed: if the objects of interest are static or moving slowly, a conventional mode is selected; if the objects of interest are moving fast, a fast response mode is selected; if the objects of interest are time-varying, a concentration mode is selected;

controlling two-dimensional stepping tracking and scanning rotating mirror and multi-band spectrum-calculating unit to track and measure spectrum according to the chosen mode;

matching the objective spectrum with a spectrum fingerprint database and realizing recognition;

the normal mode comprises: tracking and measuring the spectrum of the each object of interest from left to right, top to bottom one by one;

the concentration mode is: continuously tracking and measuring the spectrum of certain interesting objects;

the fast response comprises: tracking and measuring the spectrum of the each interested objective according to the priority order;

the priority order is:
priority order in descending order as below:
i) objects of interest in boundary area of directional arrange of deviation center and moving outside the border.
ii) objects of interest inside of the directional arrange of deviation and moving to the boundary;
iii) objects of interest moving to the inside of directional arrange of deviation; and
iv) objects of interest static in view field; and
when objects with the same priority are sequenced, a following rule is to be followed: fast moving objects are measured first and objects out of tracking range are not measured.

In a class of this embodiment, the apparatus is disposed in a housing An infrared transmitted window is arranged on the housing; and objective infrared light enters the two-dimensional stepping scanning and tracking rotating mirror.

In a class of this embodiment, a touch display, an environmental monitor, and a system operation status indication light are arranged on the housing.

In a class of this embodiment, the multi-band spectrum-measuring unit is a Fourier infrared spectrum measurement unit.

Advantages of the invention are summarized as follows:
1) spectra of multiple objects of near/short/middle wave infrared bands can be automatically measured;
2) online digital compensation and rectification processing of multi-band objects spectrum on all light paths can be realized;
3) object recognition based on spectral characteristics can be realized;
4) flexible connecting method of ZBLAN fiber light guide is employed by near/short/middle wave infrared lens unit and near/short/middle whereby improving the stability and installation flexibility;
5) multi-band measurement unit adopts Stirling cooling method whereby improving use security of system; and
6) touch display arranged on the housing is used for user interaction and graphical display and system integration is higher.

DETAILED DESCRIPTION OF THE EMBODIMENTS

Further details will be given below in conjunction with accompanying drawings.

Figure 1:
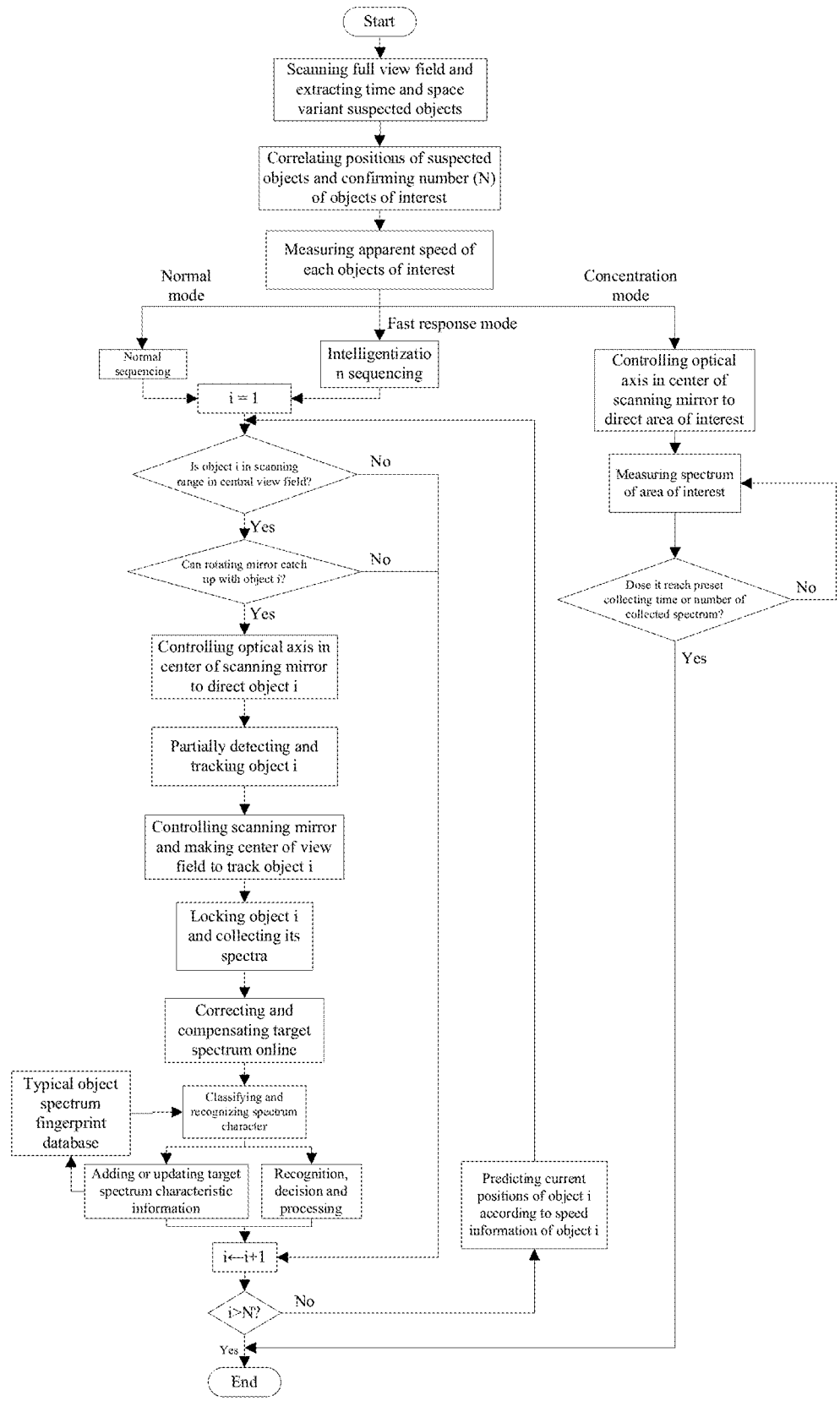
FIG. 1 is a flow chart of a method for detecting and identifying spectral characteristics of multi-band moving objects.
Figure 2:
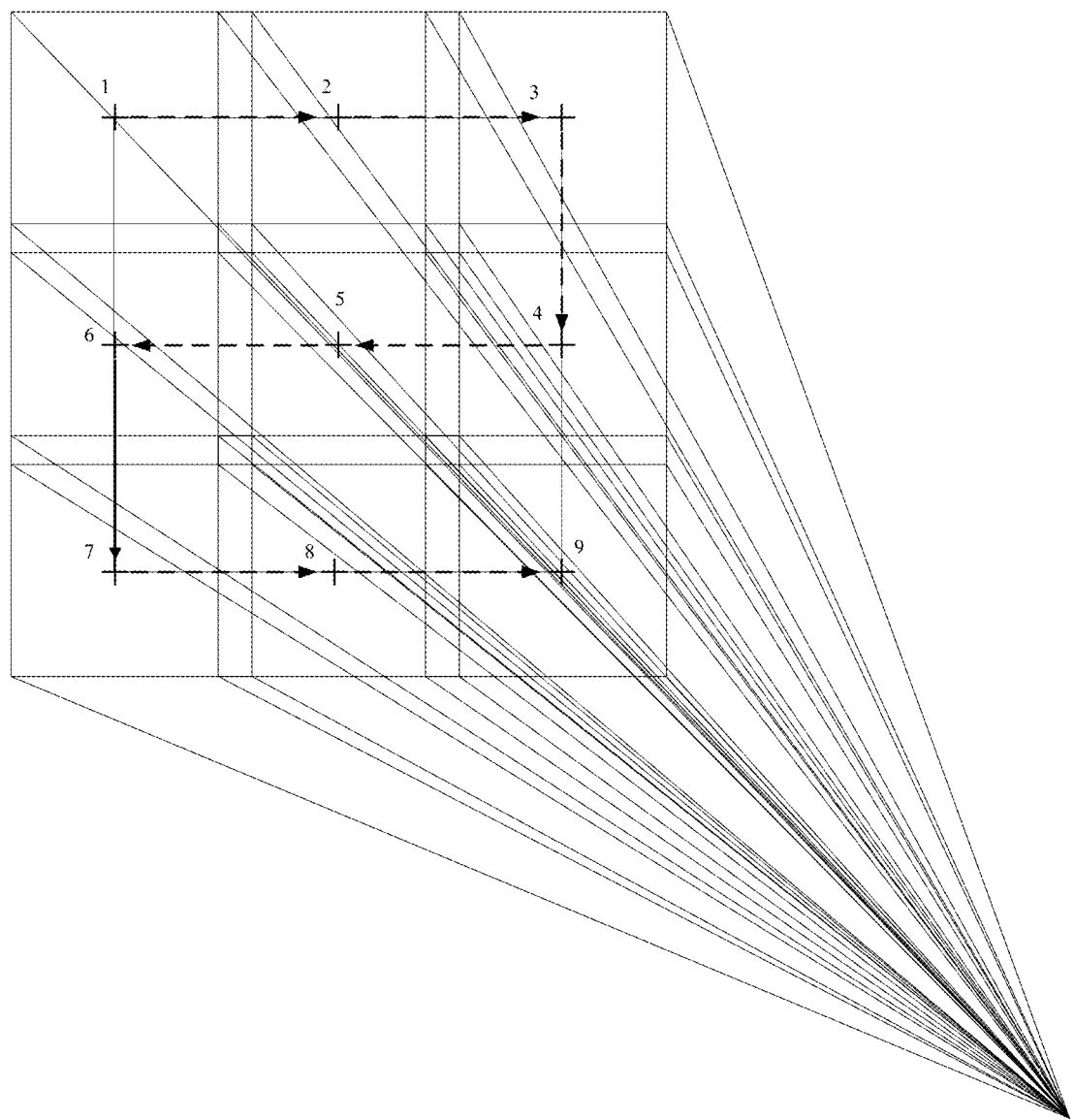
FIG. 2 illustrates a full field scanning method.

FIG. 1 is a flow chart of a method for recognizing and detecting of spectral characteristics of multi-band moving objects, the method comprises:

(1) Determining position and moving speed of each object
 (1.1) dividing a full view field into several subfields of view and scanning suspected object in each field one by one; division of subfields can be 3*3,2*2,4*4, and so on, and in this embodiment is 3*3; scanning the full view field according to the sequence of 1-9 as shown in FIG. 2, obtaining the image information of k frames in subfields of view 1-9 and extracting suspected objects from the subfields according to k frame;
 (1.2) correlating suspected objects from adjacent subfields via coordinates, confirming the number of objects of interest in the full view field is N and its coordinate position is $T_n^1(xk_n, yk_n)$, n+1, 2, 3 . . . , N; and
 (1.3) measuring the apparent speed of each objects of interest.

Figure 3:
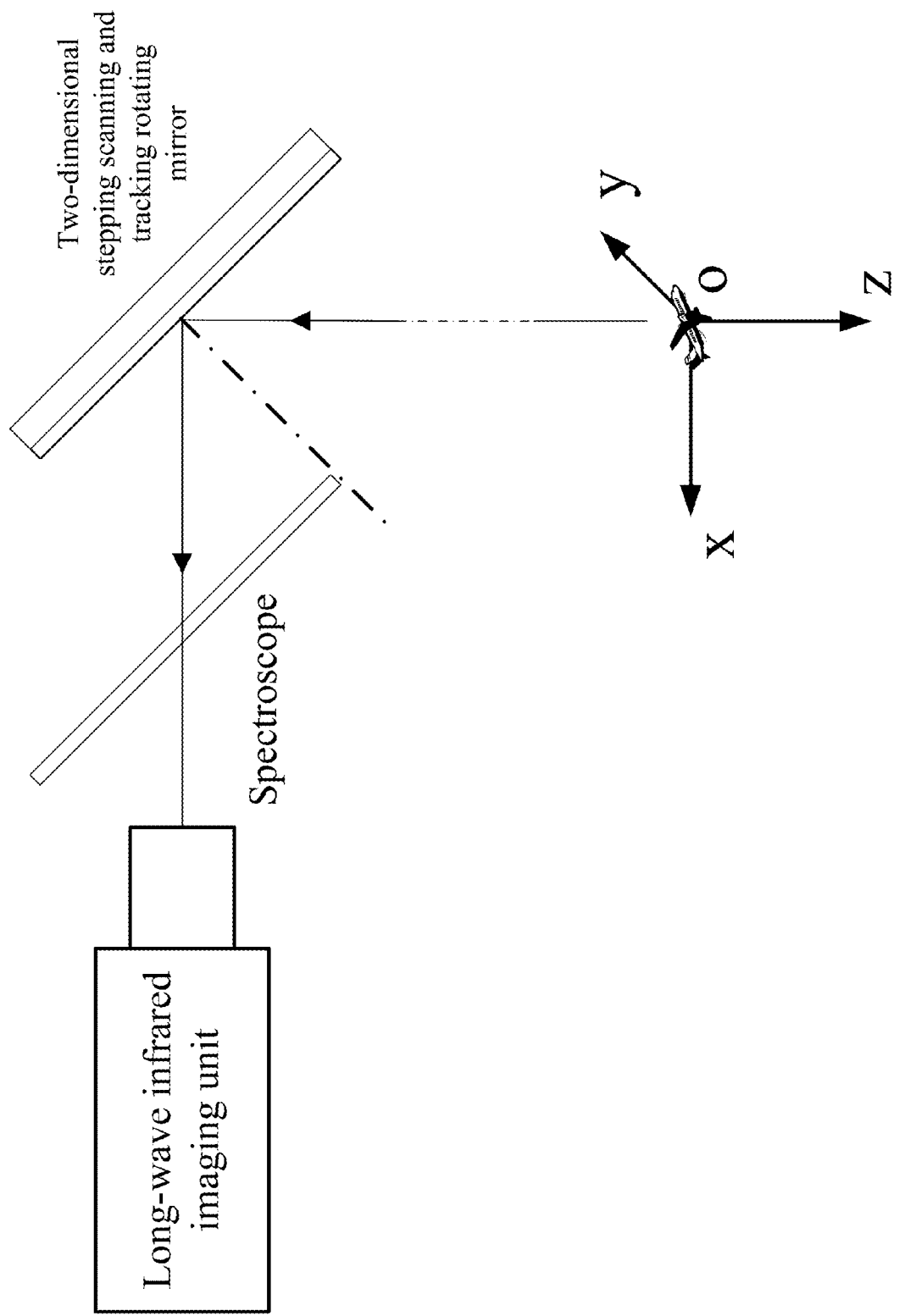
FIG. 3 illustrates decomposition diagram of moving directions of objects.

Movement of the object in three dimensional space can be decomposed as x, y orthogonal direction as shown in FIG. 3, z axis coincides with the center of field and its moving along with z axis does not change the coordination thereof in the view field; x and y axis are orthogonal with z axis and object moves along x, y axis and does not change the coordination thereof in the field. The specific measuring method of the apparent speed of the object in the field is: respectively calculating the moving speeds horizontally and vertically. Assuming a frame frequency of the long-wave infrared image is f, therefore the frame number of object $T_n$ moving from $(x0_n, y0_n)$ to coordinate $(xk_n, yk_n)$ is k, and thus the average speed $(v_{nx}, v_{ny})$ of object $T_n$ can be calculated:

$$\begin{cases} v_{nx} = \frac{(xk_n - x0_n)f}{k} \\ v_{ny} = \frac{(yk_n - y0_n)f}{k}, \end{cases}$$

unit is pixels/s (2) After obtaining the apparent speed of the objects of interest, normal mode is chosen for static or slowly moving multi-object such as pedestrian, vegetation and so on. Fast response mode is chosen for fast moving multi-object such as flying objects, automobiles and so on. Concentration mode is chosen for time varying objects such as explosion, fire hazard and so on, whereby recognizing and measuring spectrum of objects.

Recognizing and measuring spectrum of objects of interest from top to bottom, from left to right as the system is under normal mode; recognizing and measuring spectrum of objects of interest according to certain priority as the system is under fast response mode; setting up spectral measurement time or number, and then manually or automatically tracking and locking objects in view field, and obtaining object images and spectrum information, whereby obtaining the spectrum and image information of the varying characteristics and apparent characteristics of time varying objects such as explosions, fire hazard and so on during a relatively short period.

In normal mode and fast response mode, all the objects of interest within scanning range in central view field are automatically tracked and locked and then spectrum measurement and recognition are performed. Their difference lays in the spectrum measuring sequence: in fast response mode, all the objects in view field are sequenced according to certain priority and then their spectrum are measured and recognized.

The priority based on when sequencing objects in the view field under fast response mode from the highest to the lowest as below:
 i) objects of interest in border area of directional arrange of deviation center and moving outside the border.
 ii) objects of interest inside of the directional arrange of deviation and moving to the border;
 iii) objects of interest moving to the directional arrange of deviation; and
 iv) objects of interest static in view field (apparent speed is zero).

Two principles that should be followed as sequencing objects with the same priority:
 i) priority is given to fast moving objects; and
 ii) objects out of the traceability of rotating mirror are given up measuring.

After sequencing the objects of interest, spectrum are measured and recognized one by one. The steps of spectrum measurement and recognition of some object as below:

(1) According to the speed information of the objects of interest obtained from full-image detection, the current positions of the objects are predicted;

$$\begin{cases} xk_n = v_{nx}t + x0_n \\ yk_n = v_{ny}t + y0_n, \end{cases}$$

where t is time spent by object moving from $(x0_n, y0_n)$ to $(xk_n, yk_n)$.

(2) Estimating whether the objects are in the scanning range in the central view field (as the central rectangular area shown in FIG. 2. Following steps should be performed continuously if the objects is still in scanning range in central view field; if the objects are not in central view field, next object in view field in step 1 is to be detected and recognized.

(3) According to the distance between current position of the object and the center of view field and current apparent speed estimating whether rotating mirror can catch up with the object or not; if rotating mirror can catch up with the object, then following steps should be performed continuously; if it cannot, the process returns to step 1 to detect and identify next object.

(4) Controlling two-dimensional scanning and reflecting rotating mirror to direct the predicted coordinate position of the object, and partially detecting current area near to the centre of view field, then partially tracking the object after it is detected.

(5) Collecting object spectra: collection can be started, as the two-dimensional stepping scanning rotating mirror locks the object and places it in the centre of view field. Near/short/middle wave infrared multi-band spectral measurement unit employs Fourier transform infrared spectrum measurement unit with InSb and Silicon Diode and near/short/middle wave infrared band of object spectral measurement could be achieved.

(6) Online correction and compensation of target spectrum.

Figure 4:
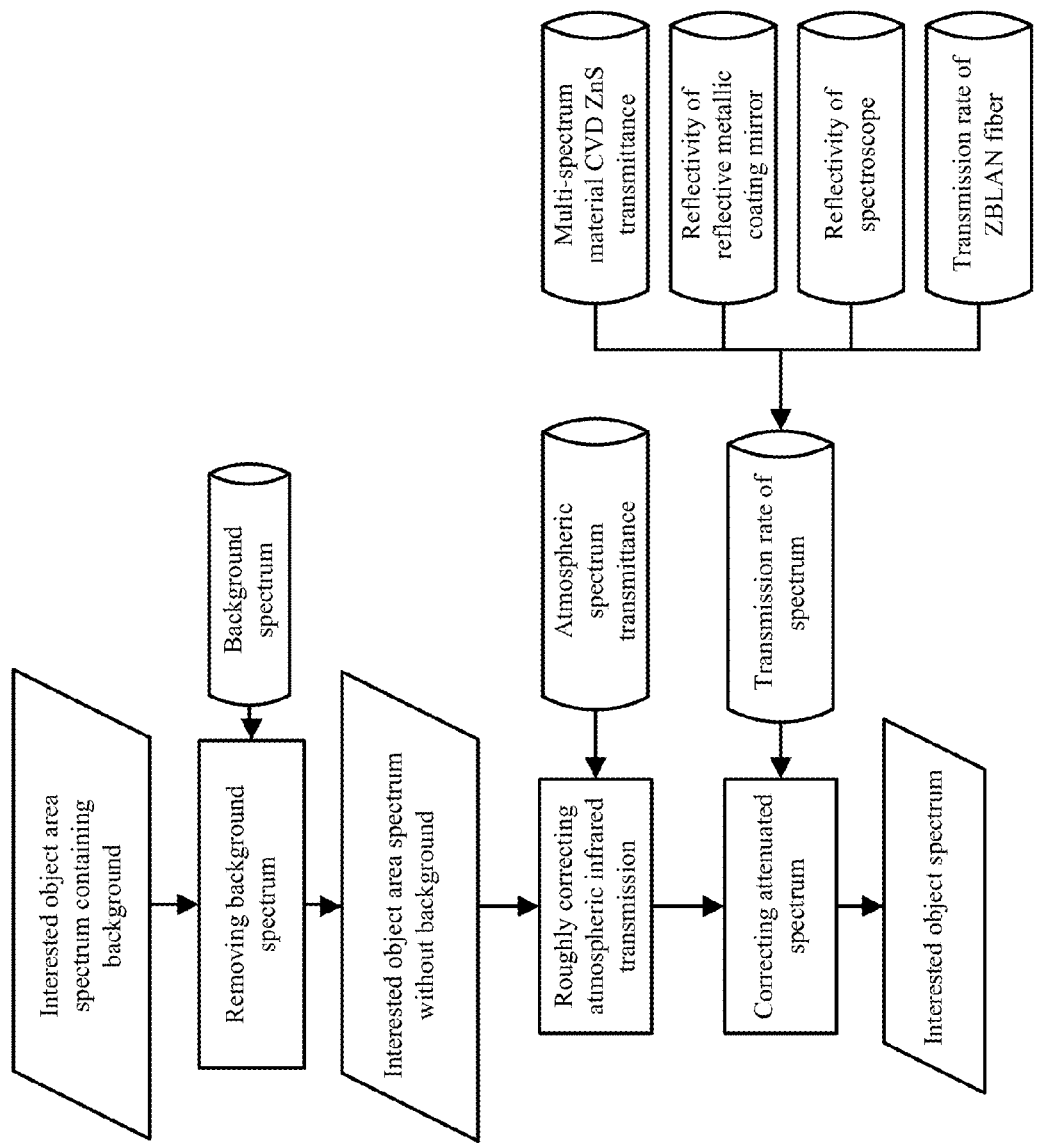
FIG. 4 is a flow chart of full field compensation and rectification processing of near/short/middle wave infrared spectrum.

Digital processing flow chart of the compensation and correction of near/short/middle/long wave infrared object spectrum information as shown in FIG. 4. removing background spectrum with object area spectrum containing background, and then compensating spectrum of object area without background wherein time and space variant object, namely dividing $$I^*(\lambda) = \begin{cases} \dfrac{I(\lambda)}{T_{total}} = \dfrac{I(\lambda)}{T_A(\lambda) \cdot T_1(\lambda) \cdot R_1(\lambda) \cdot R_2(\lambda) \cdot T_2(\lambda)}, & |I(\lambda)| > I_{noise}(\lambda) \\ I(\lambda), & |I(\lambda)| \le I_{noise}(\lambda) \end{cases} \quad (1)$$

where $I(\lambda)$ is spectral power strength with background spectrum removed, $I^*(\lambda)$ is spectral power strength of object after compensation and attenuation, $T_{Total}(\lambda)$ is the total rate of atmospheric spectrum transmittance, $T_A(\lambda)$ is window transmittance rate of near/short/middle/long wave infrared, $R_1(\lambda)$ is reflectivity of the reflective mirrors of near/short/middle/long wave infrared, $R_2(\lambda)$ is the near/short/middle/long wave infrared reflectivity of spectroscope, $T_2(\lambda)$ is spectral transmission rate of fiber with length is $L(m)$, $I_{noise}(\lambda)$ noise is the noise spectrum caused by the error of spectrum measurement unit system.

(7) Target recognition: comparing the compensated and corrected object spectrum with the spectrum in the typical object spectrum fingerprint database, the recognition result is the one with stronger visual similarity.

(8) Adding or updating target spectrum characteristic information or making decision and processing according to recognition result;

(9) Repeating above steps until all detection and recognition of the targets in view field is completed.

The concentration mode is mainly used to obtain spectrum and image data of time varying objects representing characteristic varying thereof, such as fire hazard, explosion and so on within relatively long period, and steps are as follow:

a) setting up time and number of spectrum measurement;
b) manually or automatically long-time tracking and locking targets in view field; and
c) obtaining target image and spectrum information;

Repeating steps b) and c) until it reaches the preset collecting time or the number of collected spectrum.

Figure 5:
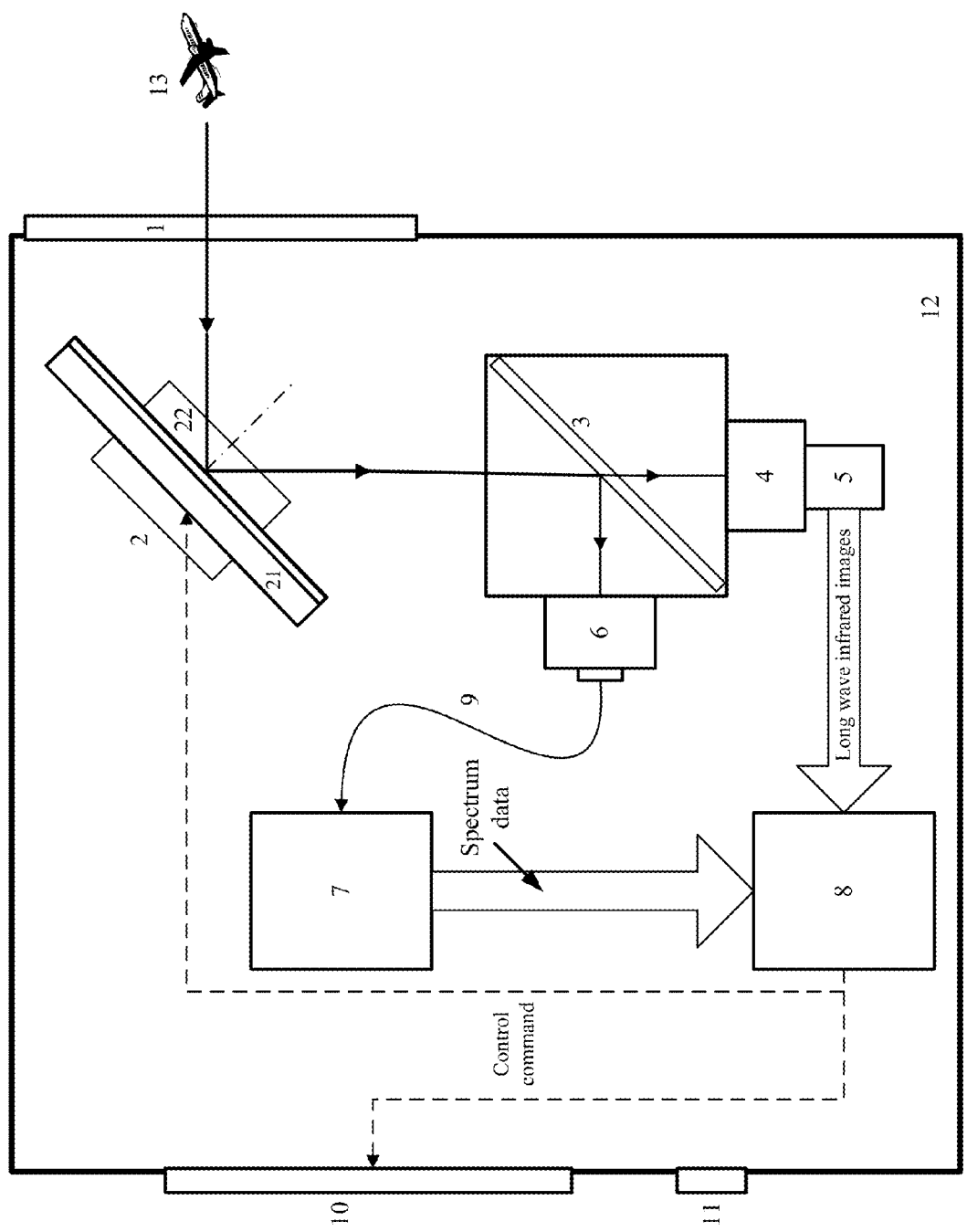
FIG. 5 is a structure diagram of an apparatus for detecting and identifying spectral characteristics of multi-band moving objects.

FIG. 5 is a structural diagram of a fast recognition and detection device of characteristics of multi-band moving spectrum which mainly comprises: infrared perspective window 1, two-dimensional stepping scanning rotating mirror 2 (comprising near/short/middle/long wave infrared reflector 22 and stepping scanning and tracking rotary table 21), spectroscope 3, long-wave infrared lens 4, long wave infrared imaging unit 5, near/short/middle wave infrared lens 6, near/short/middle wave infrared multi-band spectrum measured unit 7, calculation/controlling unit 8.

All the components are installed inside housing 12, and incident light (near/short/middle/long wave infrared light) of object 13 is through infrared perspective window 1 on the housing and is incident on near/short/middle/long wave infrared reflector 22, and the long wavelength red light in the incident light transmits the spectroscope and long wavelength infrared lens 4 and images on long wavelength infrared imaging unit 5; near/short/middle/long wavelength red light is reflected by spectroscope 3 and converges triple-band infrared light to the center of corresponding focal plane through lens 6 which transmits near/short/middle/long wavelength infrared light, and transmitted to near/short/middle/long wavelength infrared multi-band spectrum calculated unit 7 by optical fiber(beam) 9 coupled to the center. Calculating and controlling unit 8 is mainly responsible for receiving long wavelength infrared image, spectrum information and processing and analyzing real time data, and controlling two-dimensional stepping scanning and tracking rotating mirror 2.

Figure 6:
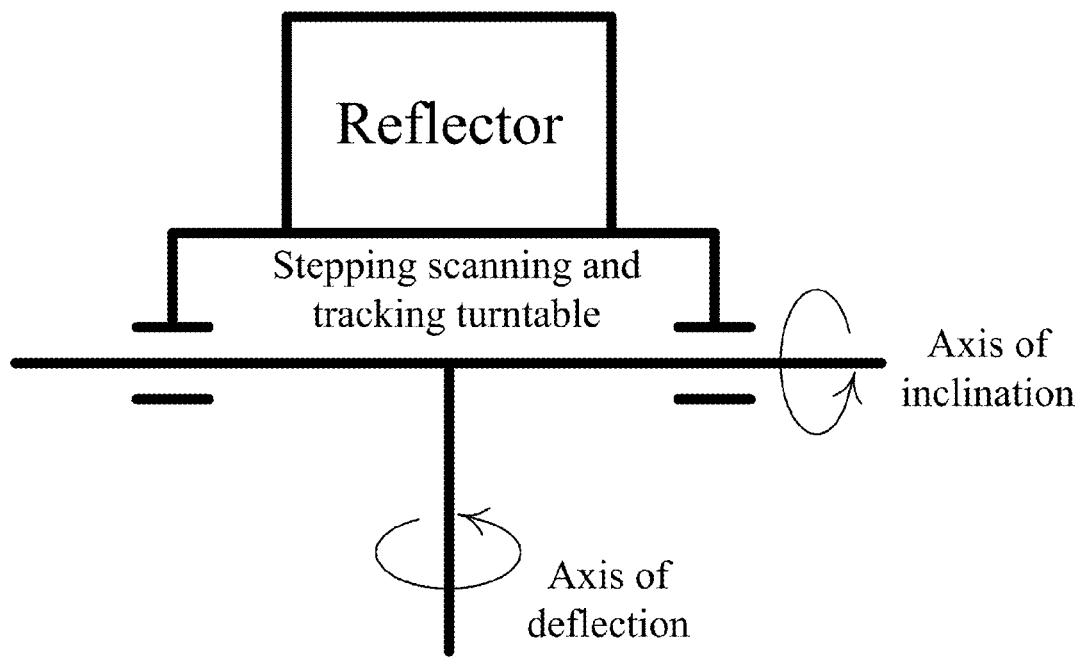
FIG. 6 is a structure diagram of two-dimensional stepping scanning and tracking rotating mirror.
Figure 7A:
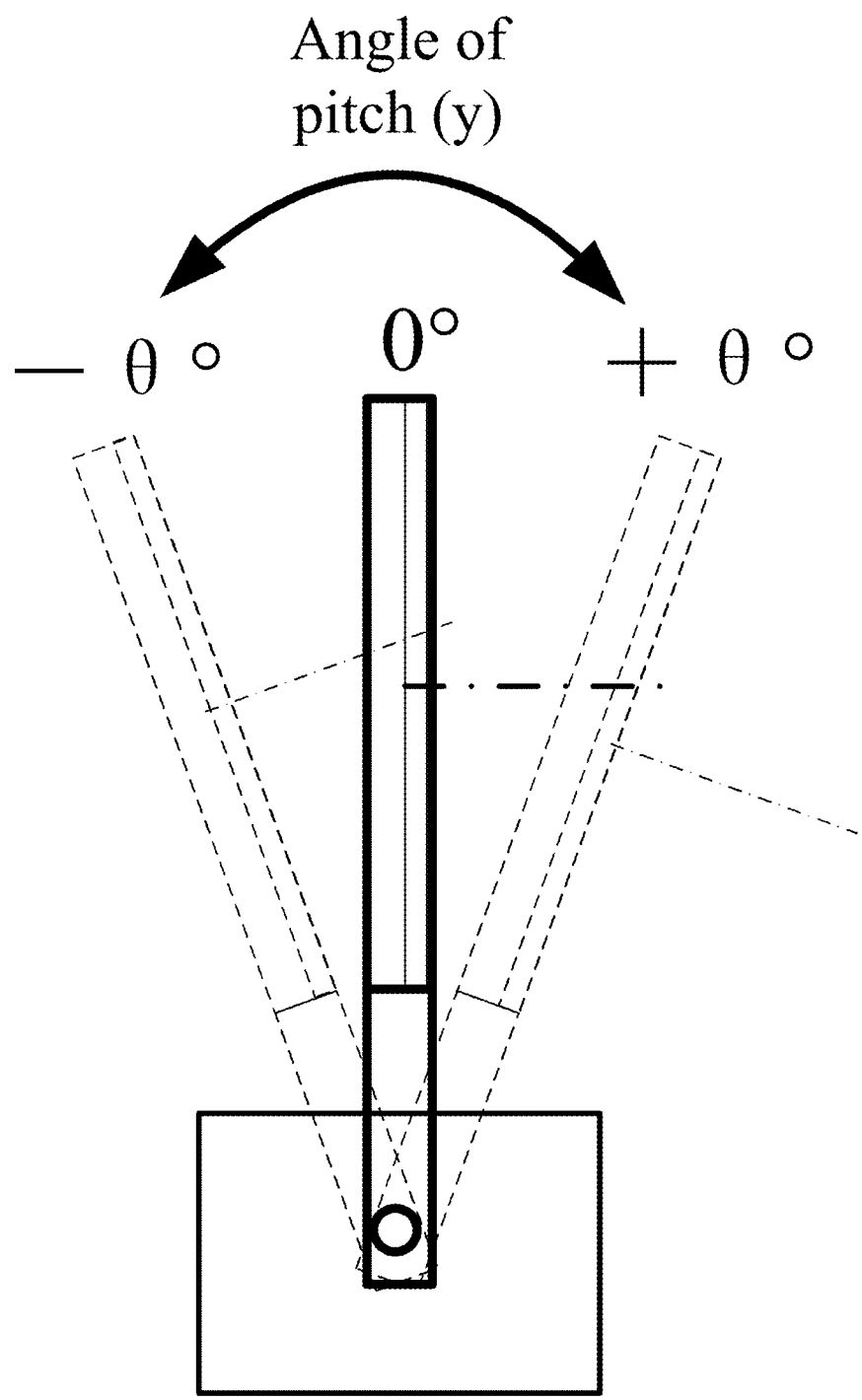
FIGS. 7a-7b are a structure diagram of scanning range of two-dimensional stepping scanning and tracking rotation mirror.
Figure 7B:
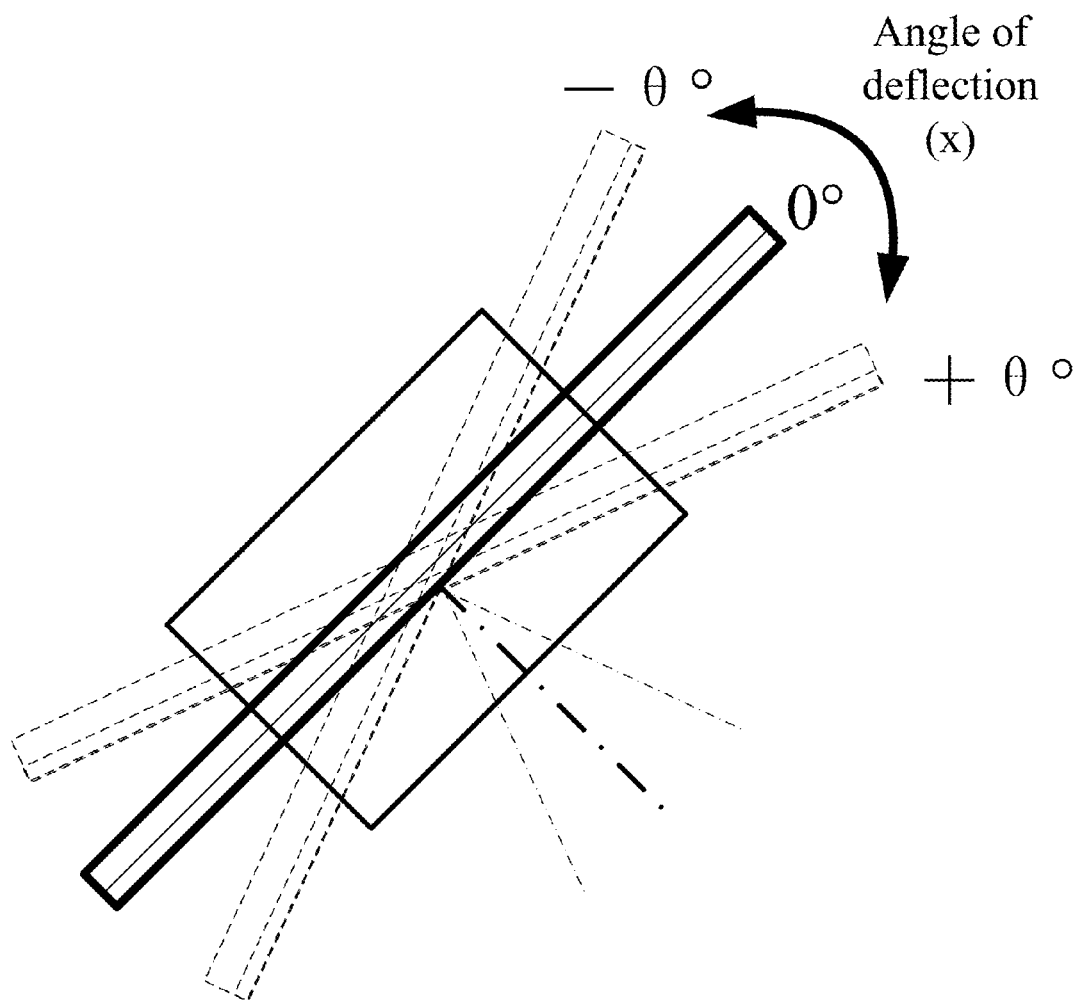

Infrared perspective window 1 on housing employs multi-spectrum material CVD ZnS which have high transmittance in near/short/middle/long wavelength infrared bands. Two-dimensional stepping scanning and tracking rotating mirror 2 comprise near/short/middle/long wavelength infrared reflector 22 and stepping scanning and tracking turntable 21 as shown in FIG. 6. Stepping scanning and tracking turntable 21 can drive the reflector 22 to deflect and incline and the range of the motion both are $-\theta°$ to $+\theta°$. As shown in FIGS. 7a-7b, FIG. 7a shows the slant and scanning range of two-dimensional stepping scanning and tracking rotating mirror, FIG. 7b shows the deflecting and scanning range of two-dimensional stepping scanning and tracking rotating mirror.

An example is given below:

$\theta$ is defined to be 5, field angle of imaging field of long wavelength imaging unit 5.12°×3.48°, long wavelength infrared lens 4 can manually focus whereby changing field size. The rotating range of two-dimensional scanning and tracking rotating mirror 2 is $\pm\theta°$ (horizontal)×$\pm\theta°$ (vertical), according to the position of rotating mirror, the whole view field can be divided into subfields numbered as 9-19 as shown in FIG. 2, and two adjacent subfields have overlapping region.

The reflector 22 of two-dimensional stepping scanning and tracking rotating mirror has relatively high reflectivity in near/short/middle/long wavelength bands; the spectroscope 3 has relatively high reflectivity in near/short/middle wave infrared bands and has relatively high transmittance in long wavelength band. The near/short/middle wavelength infrared lens 6 is flexibly connected with the near/short/middle/long wavelength infrared multi-band spectrum-measuring unit 7 by ZBLAN optical beam with length is 0.5 m; the multi-band spectrum-measuring unit 7 is Fourier transformed infrared spectrum measurement unit 7 with double detectors InSb and Silicon Diode, which employs stirling cooling method and can measure target spectrum in near/short/middle wavelength infrared bands.

All electrical components and units in the system were supplied by power port (220V/3A) on the housing. To ensure a dry working environment inside system, dry barrier is put therein and desiccating agent is regularly replaced through desiccant entrance in the housing. Touch screen 10 installed in the housing is for users to operate and graphically display. An environmental monitor and a system operation status indication light 11 are installed in the housing to display temperature and humidity inside the system and current operation state of the system.

Attenuation of all light paths of the apparatus to infrared radiation comprises: atmospheric attenuation, near/short/medium/long wave infrared transmission window attenuation, two-dimensional scanning and reflecting rotating mirror attenuation, spectroscope attenuation, and optical attenuation.

Figure 8:
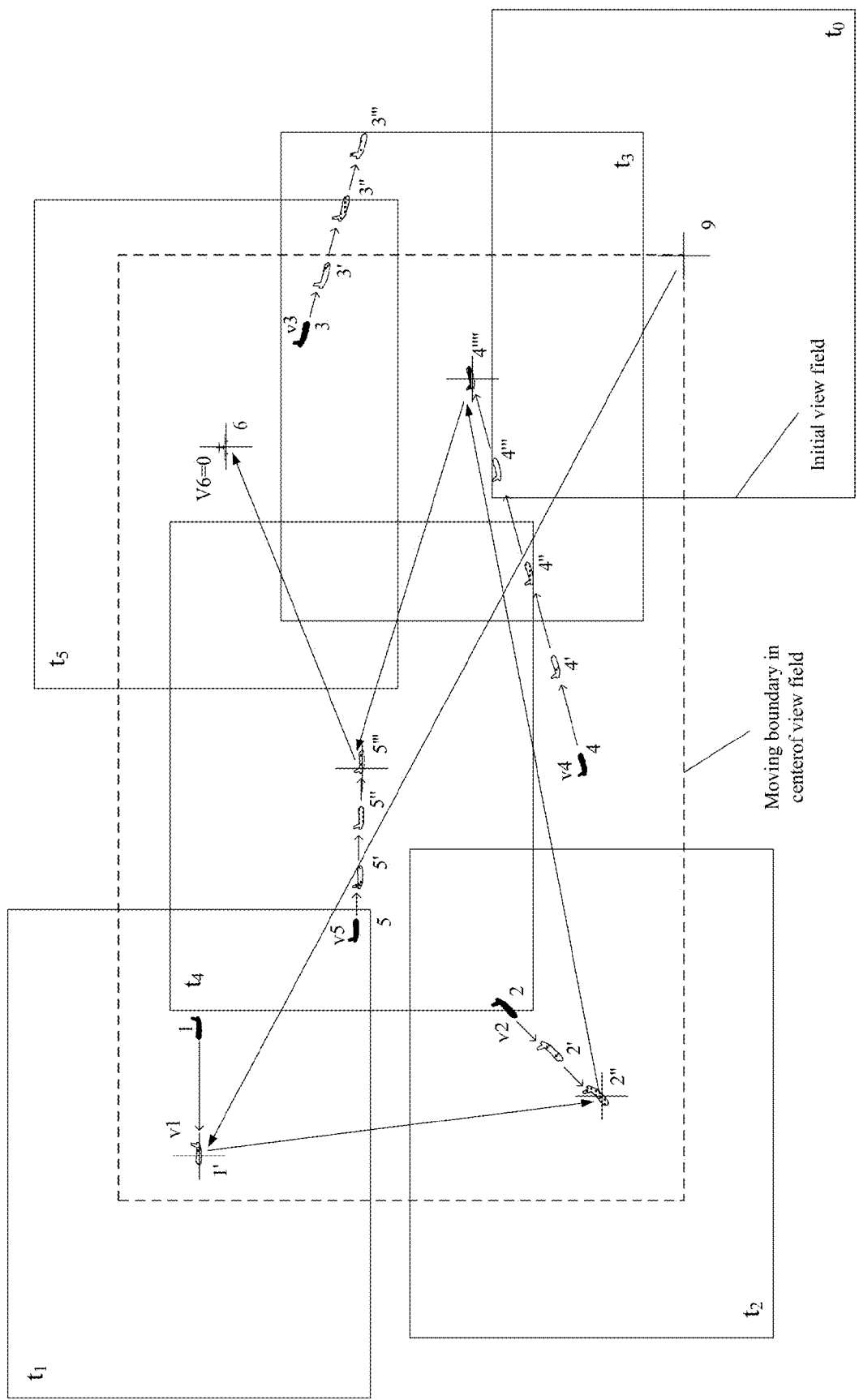
FIG. 8 illustrates an example of acquiring, tracking multiple moving objects and measuring spectrum in a fast response mode.

FIG. 8 illustrates the whole process of target acquiring, tracking and spectrum measuring under fast response mode. The figure illustrates the process of the center of optical axis directing at each targets of interest. Thick full wireframe in the figure is moving boundary in centre of view field, and centre of axis can direct at any target at any position in the region.

Scanning of whole view field, coordinate correlation of object of interest and measurement of apparent speed. According to the full view field scanning scheme shown in FIG. 2, k frames infrared images in each subfield of 1-9 are obtained, then pixel coordinate in every target from zero to kth is recording as $T_n$ ($x0_n$, $y0_n$) and $T_n$ ($xk_n$, $yk_n$), and targets of interest are coordinate correlated whereby ensuring the number of existing object in is TagNum=6, and coordinate position is $T_n$' ($xk_n$, $yk_n$) (n=1, 2 . . . 6), because that frame frequency of long wavelength infrared imaging unit obtaining long wavelength image is 25 Hz, it took 0.04 ks for target n moving from $T_n$ ($x0_n$, $y0_n$) to $T_n$ ($xk_n$, $yk_n$), and thus the average apparent speed ($v_{nx}$, $v_{ny}$) of object $T_n$ can be calculated:

$$\begin{cases} v_{nx} = \dfrac{xk_n - x0_n}{0.04k} \\ v_{ny} = \dfrac{yk_n - y0_n}{0.04k} \end{cases}, (n = 1, 2 \ldots 6)$$

Six targets in view field are sequenced according to the sequencing principle under fast response mode, figure shows target T1, T2, T3 are in the vicinity of boundary and moving to the boundary, T4 with highest priority is moving to vicinity; T5 with second highest priority is moving inside the full view field; T6 with relatively low priority is measured lastly. Target T1, T2, T3 are in the same priority, and because the apparent moving speed is T1>T2>T3, the measuring order is T1-T2-T3. Measuring order of the target of interest is T1T2T3T4T5T6.

Next, controlling two-dimensional stepping scanning and tracking rotating mirror to make axis centre directs at each target and measure target spectrum. The completion time of scanning full view is T0, at this time, axis centre directs at $9^{th}$ subfield. Firstly, controlling turntable to direct the center of view field at 1, and detecting and tracking target T1 partially. If the distance between target centre and view field centre is below certain limitation in frame detections at least 12 times in recent 15 times detections, and it is thought the tracking of the target is stable and in locked state, at this time effective spectrum can be obtained by starting non imaging spectrum measurement unit.

After the completion of collecting the spectrum of target T1, read time of the system is $t_2$, during $t_0$ to $t_2$, target T2 has already moves to 2" at the rate of ($v_{2x}$, $v_{2y}$) predicting coordinate position of target 2" ($x_2$, $y_2$)

$$\begin{cases} x_2 = xk_2 + (t_2 - t_0) \times v_{2x} \\ y_2 = yk_2 + (t_2 - t_0) \times v_{2y} \end{cases}$$

Position of target 2 is not out of directional range of axis centre, and during the switch of axes, target T2 is not moving out of the boundary, so assuming axis center can track object T2. controlling two-dimensional stepping scanning and tracking rotating mirror to direct at object 2, and partially detecting and tracking T2, collecting spectrum of T2 after object 2 is locked.

After the collection of the spectrum of T2, system time is read and record as $t_3$, during t0-t3, target 3 has already moved to 3 at rate of ($v_{3x}$, $v_{3y}$) and predict coordinate of 3 as ($x_3$, $y_3$)

$$\begin{cases} x_3 = xk_3 + (t_3 - t_0) \times v_{3x} \\ y_3 = yk_3 + (t_3 - t_0) \times v_{3y} \end{cases}$$

Because the target 3 is out of directional range of center view field, T3 is given up to measure spectrum. Predicting current position of object T4, and employing the same method to measure target T4-T6. All the spectra of targets of interest in scanning view field are obtained.

Figure 9A:
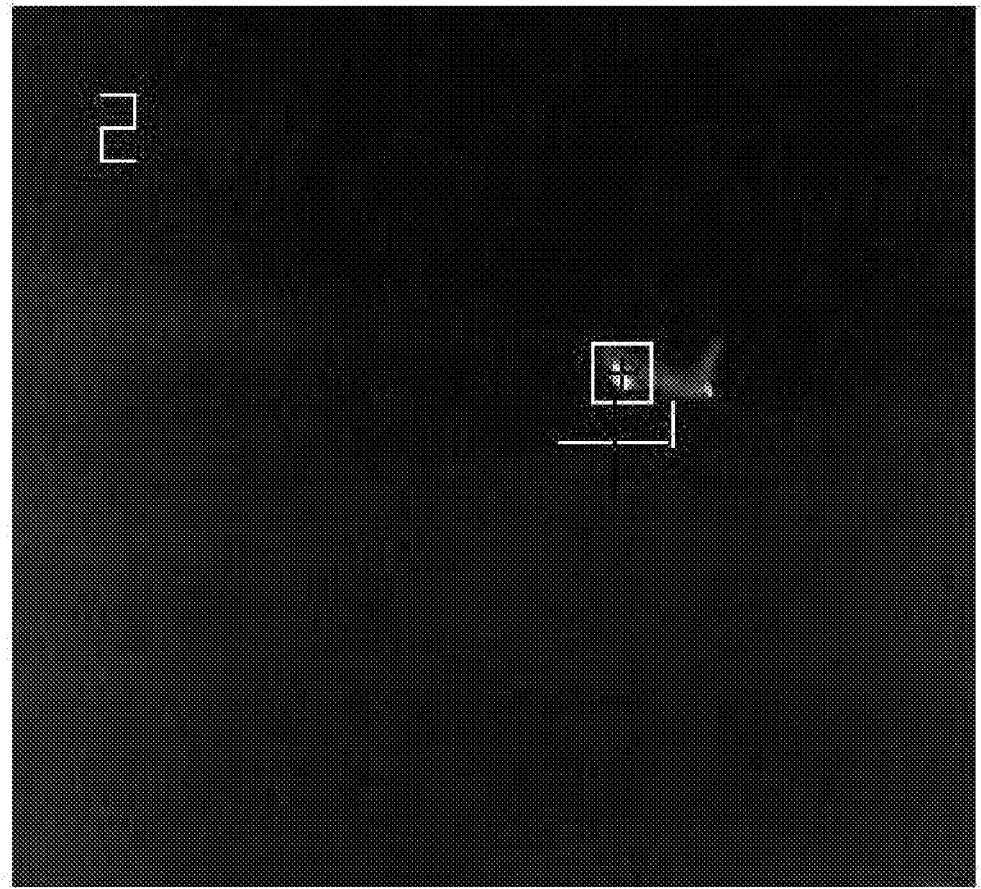
FIGS. 9a-9d illustrate infrared imagery, spectrum measurement and processing result of a flying object.
Figure 9B:
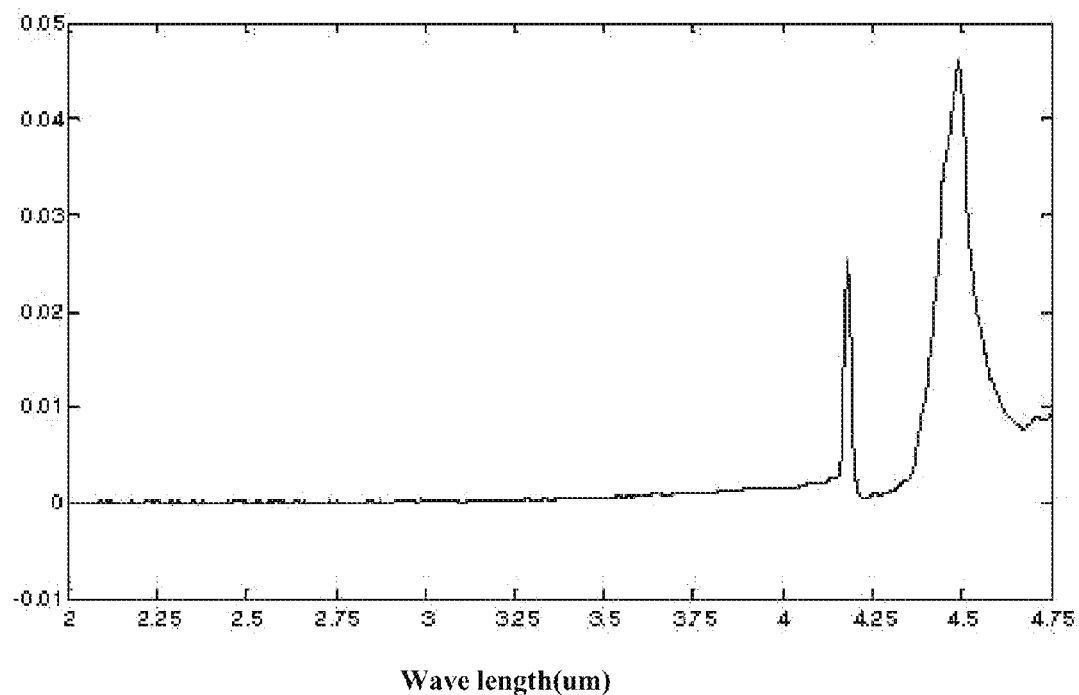
Figure 9C:
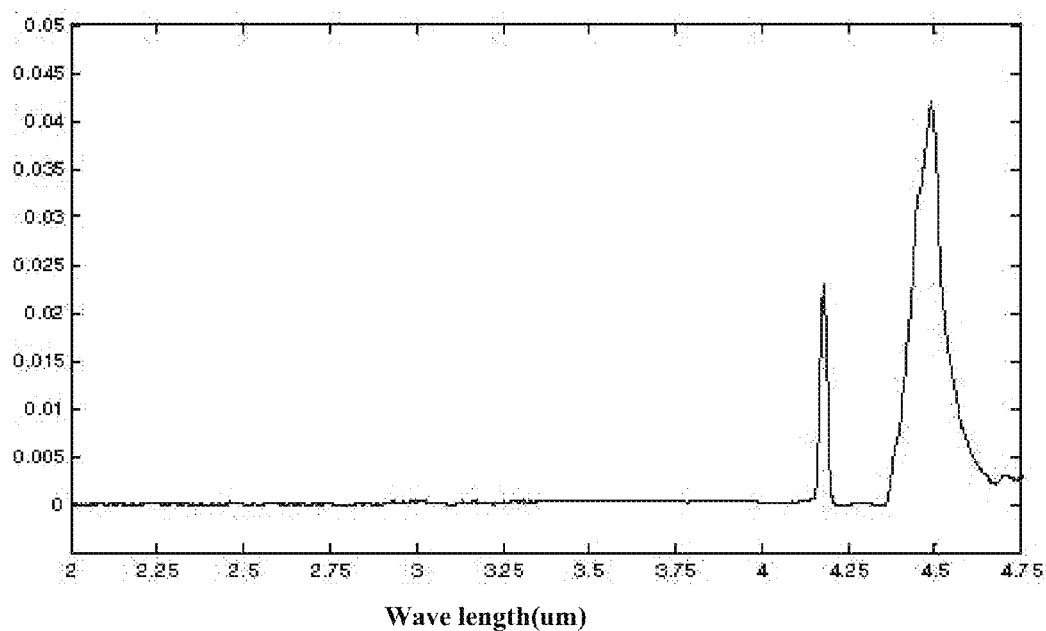
Figure 9D:
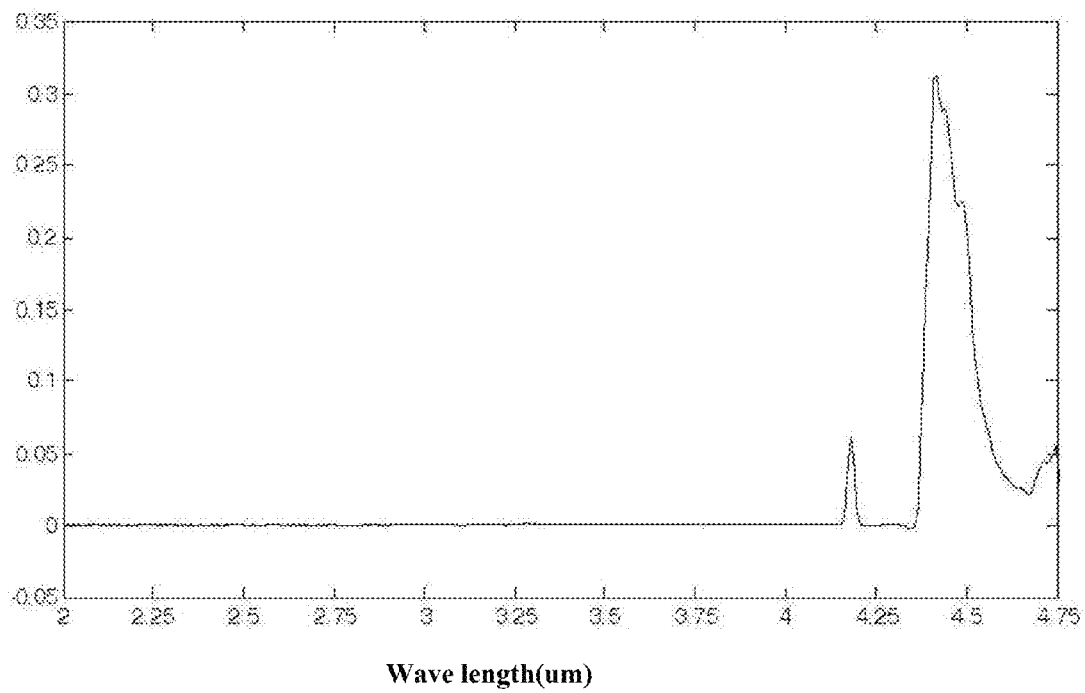

FIGS. 9a-9d show the infrared image of some flying object and experimental spectrum and processing results. FIG. 9a is one frame of infrared video sequence, 9b is spectrum of target area region with background, 9c is spectrum of target area region without background, and 9d is target spectrum after compensated and corrected by system.

Figure 10A:
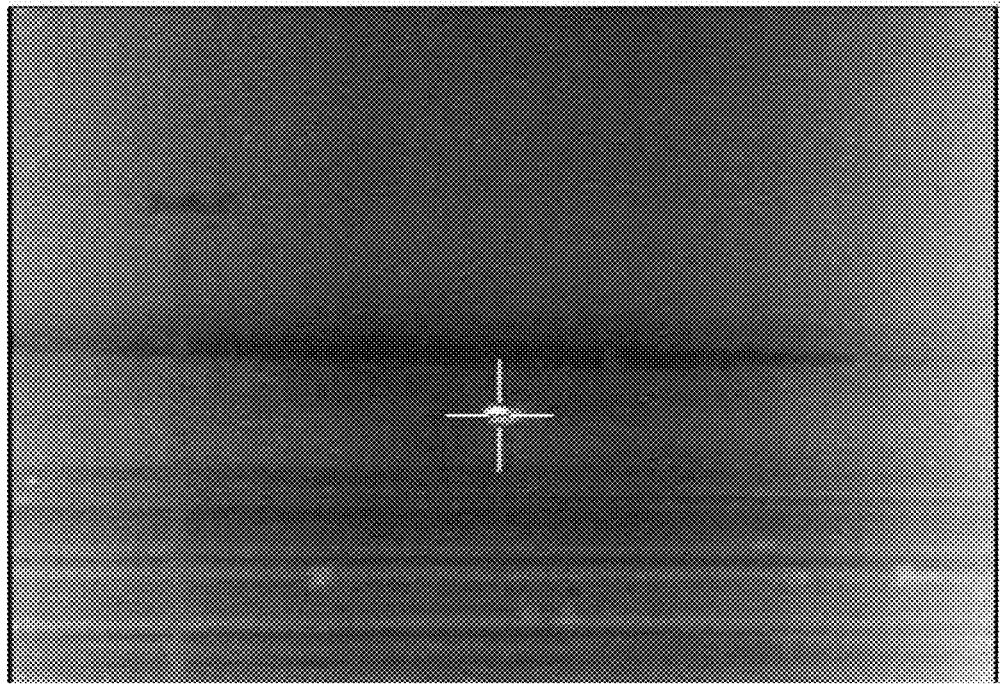
FIGS. 10a-10d illustrate infrared imagery, spectrum measurement and processing result of high-pressure sodium lamp at the airport.
Figure 10B:
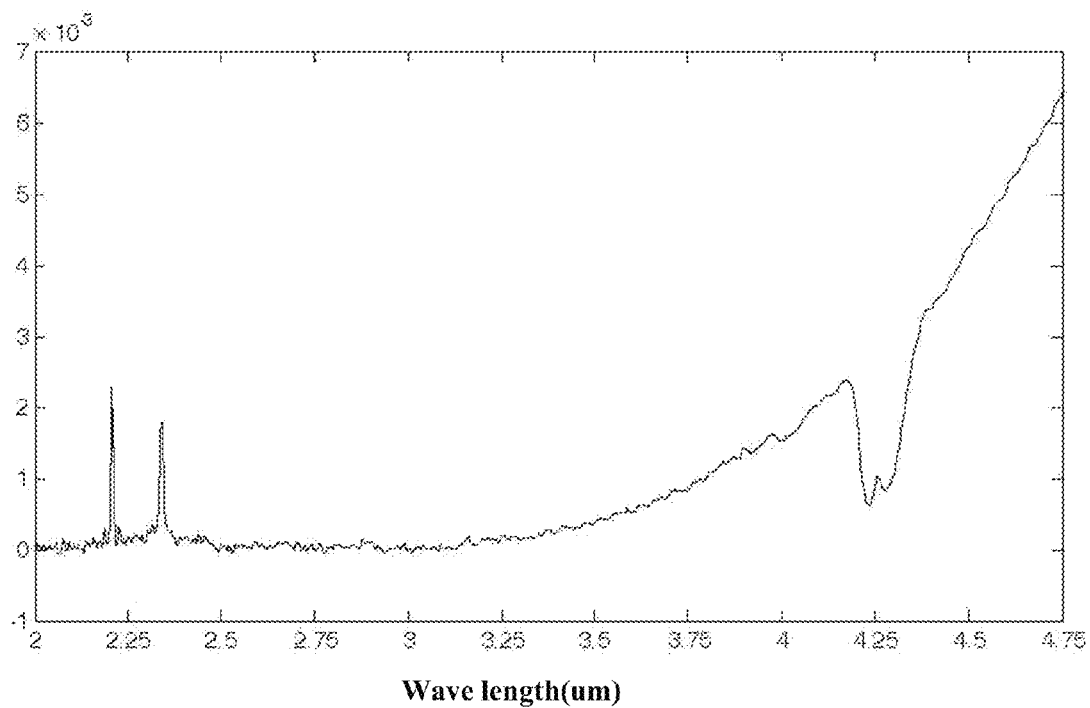
Figure 10C:
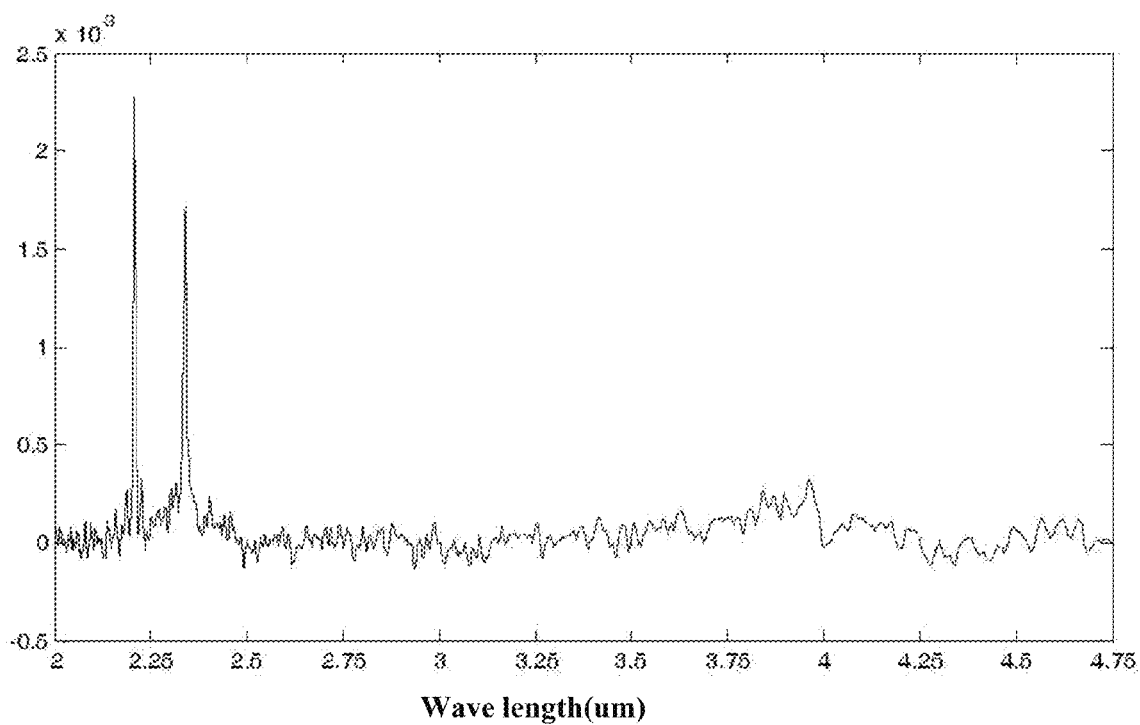
Figure 10D:
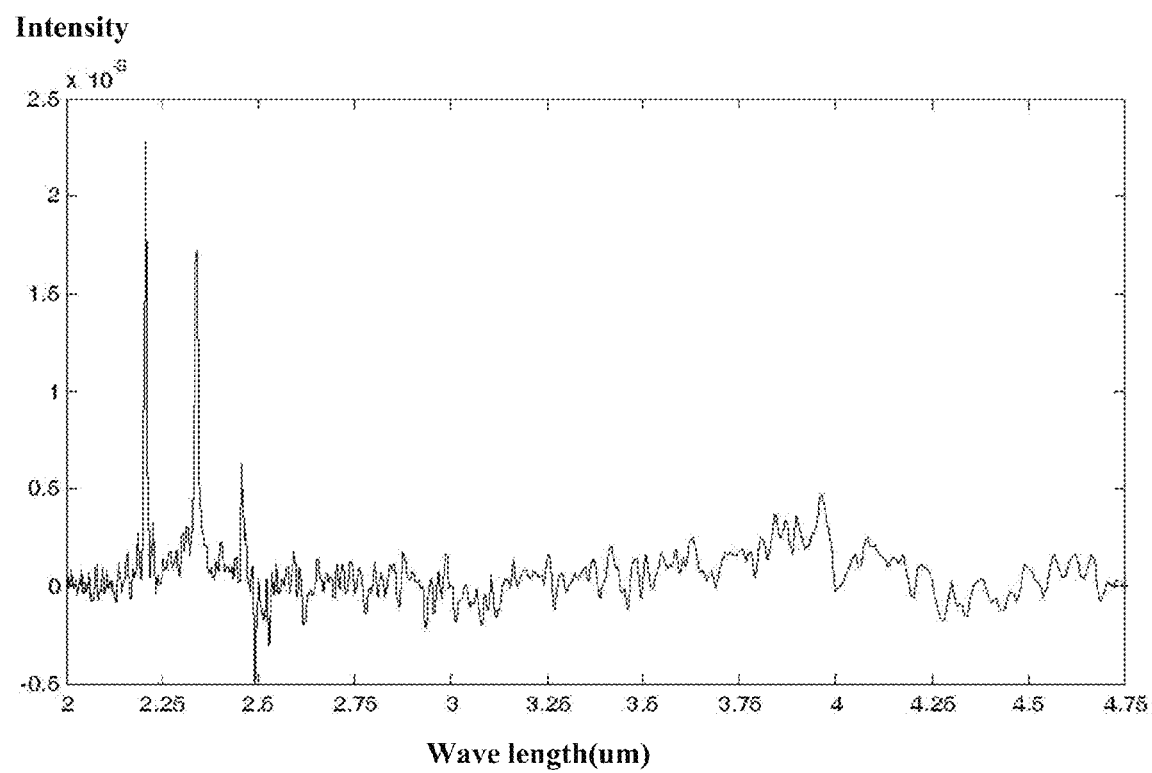

FIGS. 10a-10d show infrared image and experimental spectrum and processing results of high pressure sodium lamp in airport. FIG. 10a is one frame of infrared video sequence, 10b is spectrum of target area region with background, 10c is spectrum of target area region without background, and 10d is object spectrum after s after compensated and corrected by system.

Figure 11A:
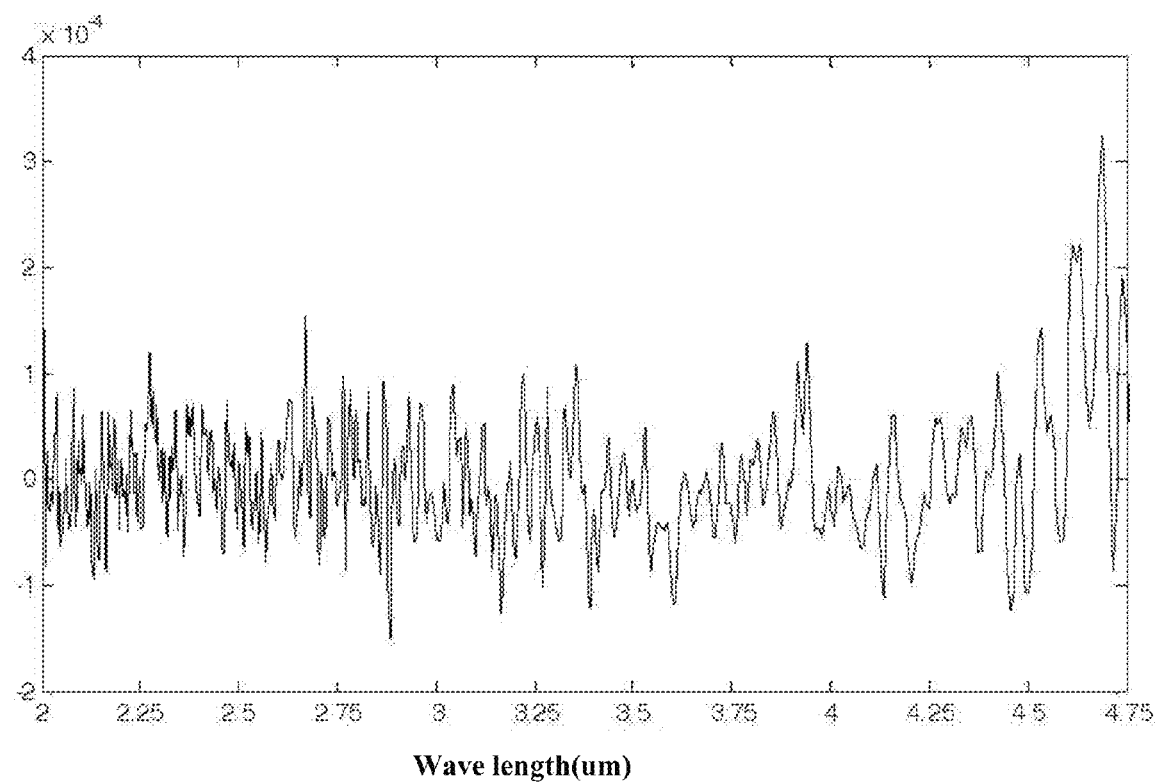
FIGS. 11a-11d illustrate processing results of spectrum measurement of alcohol in different combustion phases.
Figure 11B:
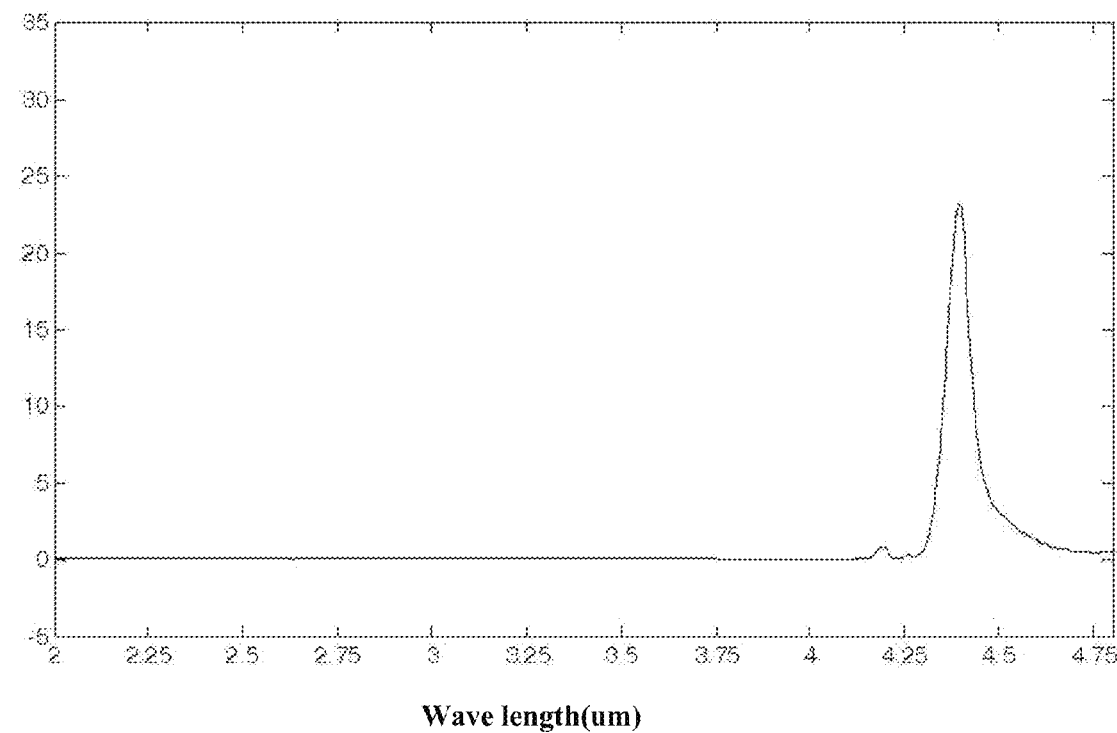
Figure 11C:
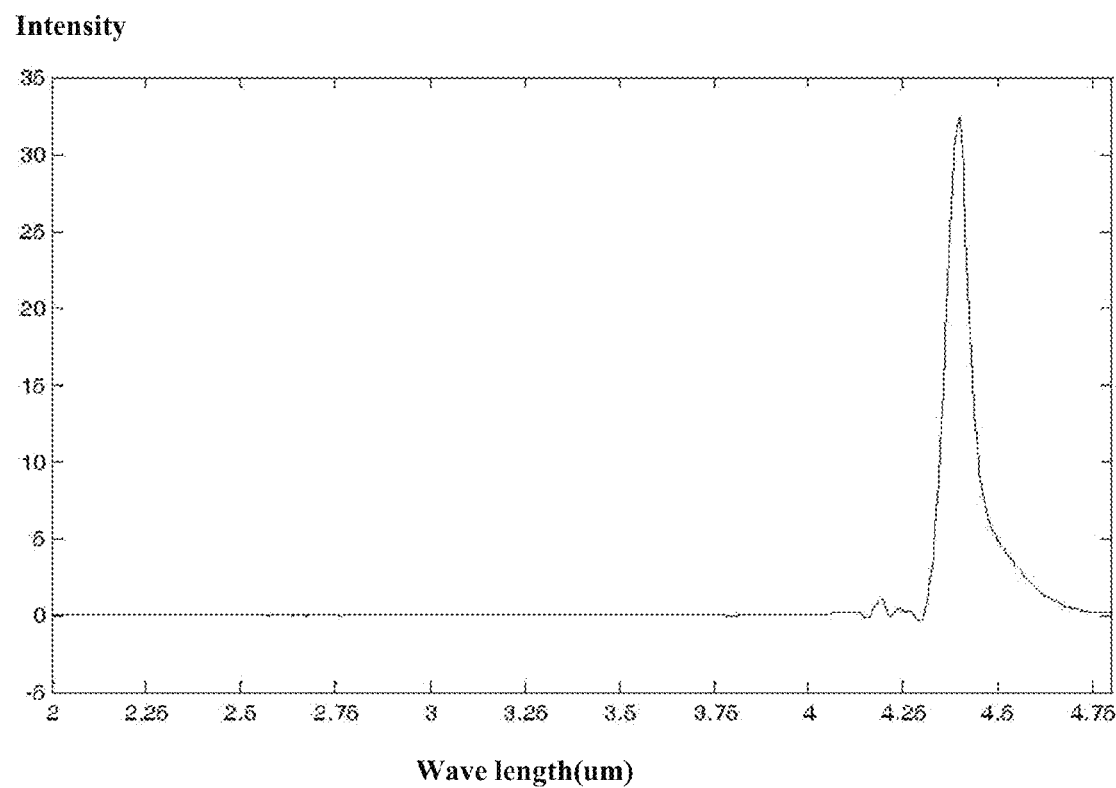
Figure 11D:
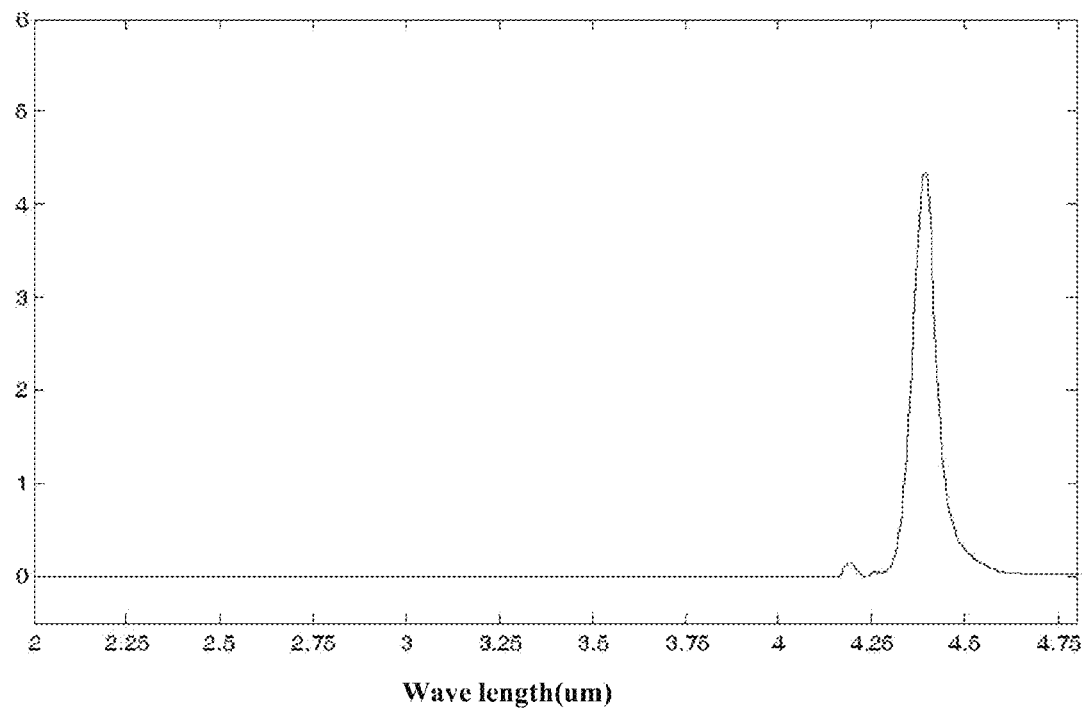

FIGS. 11a-11d show the spectrum processing result of alcohol in different combustion phases under concentration mode. FIG. 11a is the result of spectrum measurement before combustion, 11b is the result of spectrum measurement as the alcohol starts to combust (at $20^{th}$ second), 11c is the result of spectrum measurement at the middle of combustion of alcohol (at 42th second), and 11d is the result of spectrum measurement at $20^{th}$ second after the combustion is out.

The invention claimed is:

1. A method for detecting spectral characteristics of multi-band moving objects, the method comprising:
   1) dividing a full field of view into several subfields of view, and scanning and extracting suspected objects in each subfield one by one;
   2) correlating interrelated suspected objects in adjacent subfields via coordinates to determine objects of interest that exist in the full field of view, a current coordinate position of the objects of interest being denoted as $T'_n$ ($xk_n$,$yk_n$), n=1, 2, 3 . . . N, N representing a number of the objects of interest;
   3) calculating the speeds of objects of interest $$\begin{cases} v_{nx} = \dfrac{(xk_n - x0_n)f}{k} \\ v_{ny} = \dfrac{(yk_n - y0_n)f}{k}, \end{cases}$$

representing a frame number of objects moving from starting point ($x0_n$, $y0_n$) to coordinate ($xk_n$, $yk_n$), and f representing a frame frequency of long-wave infrared images;
   4) calculating average speed of all objects of interest and classifying the objects of interest according to their average speed: if the objects of interest are static or moving slowly, a conventional mode is selected; if the objects of interest are moving fast, a fast response mode is selected; if the objects of interest are time-varying, a concentration mode is selected;
- a) the conventional mode comprising: tracking and calculating spectrum of each object of interest from left to right, from top to bottom one by one;
- b) the fast response mode comprising: tracking and calculating spectrum of each object of interest sequenced according to priority order one by one;
- c) the concentration mode comprising: continuously tracking and measuring spectrum of certain objects of interest;
- d) the priority order in descending order being:
    i. objects in the vicinity of a boundary of a range of a center of an optical axis and moving out of the boundary;
    ii. objects in the boundary of a range of a center of an optical axis and moving towards the boundary;
    iii. objects moving to inner side of a range of a center of an optical axis; and
    iv. objects keeping static in the view field; and
    v. when objects with the same priority being sequenced, a following rule being followed: fast moving objects being measured first and objects out of tracking range not measured;
5) compensating and rectifying the objective spectrum obtained from calculation; and
6) matching the compensated and rectified objective spectrum with a spectrum fingerprint database whereby realizing recognition.

2. An apparatus for implementing the method of claim 1, comprising:
1) a two-dimensional stepping scanning and tracking rotating mirror (2);
2) a spectroscope (3);
3) a long-wave infrared lens unit (4);
4) a long-wave infrared imaging unit (5);
5) a near/short/medium wave infrared lens unit (6);
6) a multi-band spectrum-measuring unit (7); and
7) a calculating/controlling unit (8);
wherein
the two-dimensional stepping scanning and tracking rotating mirror reflects the objective infrared light to the spectroscope;
the spectroscope transmits long wave of the infrared light to the long wave infrared lens unit;
the long wave infrared lens unit focalizes the long wave infrared light, and transmits the long wave infrared light to the long wave infrared imaging unit;
the spectroscope reflects the near/short/medium wave infrared light of the infrared light to the near/short/medium wave infrared lens unit;
the near/short/medium wave infrared lens unit focalizes near/short/medium wave infrared light, and transmits the near/short/medium wave infrared light to the multi-band spectrum-measuring unit;
imaging result of the long wave infrared imaging unit and the spectrum measurement data of the multi-band spectrum-measuring unit are transmitted to calculation/control unit;
the calculation/control unit controls two-dimensional stepping scanning and tracking rotation mirror to scan full view field to extract suspected objects in each subfield of view;
correlating interrelated suspected objects in adjacent subfields via coordinates to identify the existing objects of interest in full view field, a current coordinate position of the objects of interest being denoted as $T_n'(xk_n, yk_n)$, n=1, 2, 3 . . . , N, N representing a number of the objects of interest;
calculating the speed of objects of interest $$\begin{cases} v_{nx} = \dfrac{(xk_n - x0_n)f}{k} \\ v_{ny} = \dfrac{(yk_n - y0_n)f}{k} \end{cases},$$

and k representing a frame number of objects moving from starting point $(x0_n, y0_n)$ to coordinate $(xk_n, yk_n)$, and f representing a frame frequency of long wave infrared images;
calculating average speed of all objects of interest and classifying the objects of interest according to their average speed: if the objects of interest are static or moving slowly, a conventional mode is selected; if the objects of interest are moving fast, a fast response mode is selected; if the objects of interest are time-varying, a concentration mode is selected;
controlling two-dimensional stepping tracking and scanning rotating mirror and multi-band spectrum-calculating unit to track and measure spectrum according to the chosen mode;
matching the objective spectrum with a spectrum fingerprint database and realizing recognition;
the normal mode comprises: tracking and measuring the spectrum of the each object of interest from left to right, top to bottom one by one;
the fast response mode comprises: tracking and measuring the spectrum of the each interested objective according to the priority order;
the concentration mode comprises: continuously tracking and measuring the spectrum of certain interesting objects;
the priority order in descending order is as below:
i) objects of interest in boundary area of directional arrange of deviation center and moving outside the border;
ii) objects of interest inside of the directional arrange of deviation and moving to the boundary;
iii) objects of interest moving to the inside of directional arrange of deviation; and
iv) objects of interest static in view field; and
when objects with the same priority are sequenced, a following rule is to be followed: fast moving objects are measured first and objects out of tracking range are not measured.

3. The apparatus of claim 2, wherein the apparatus is disposed in a housing (12), an infrared transmitted window (1) is arranged on the housing, and objective infrared light enters the two-dimensional stepping scanning and tracking rotating mirror.

4. The apparatus of claim 3, wherein a touch display (10), an environmental monitor, and a system operation status indication light (11) are arranged on the housing.

5. The apparatus of claim 3, wherein the multi-band spectrum-measuring unit is a Fourier infrared spectrum measurement unit.

6. The apparatus of claim 2, wherein the multi-band spectrum-measuring unit is a Fourier infrared spectrum measurement unit.

* * * * *